April 30, 1935. G. STEINER 1,999,308
COOLING OF MACHINES HAVING ROTARY PARTS
Filed July 24, 1934
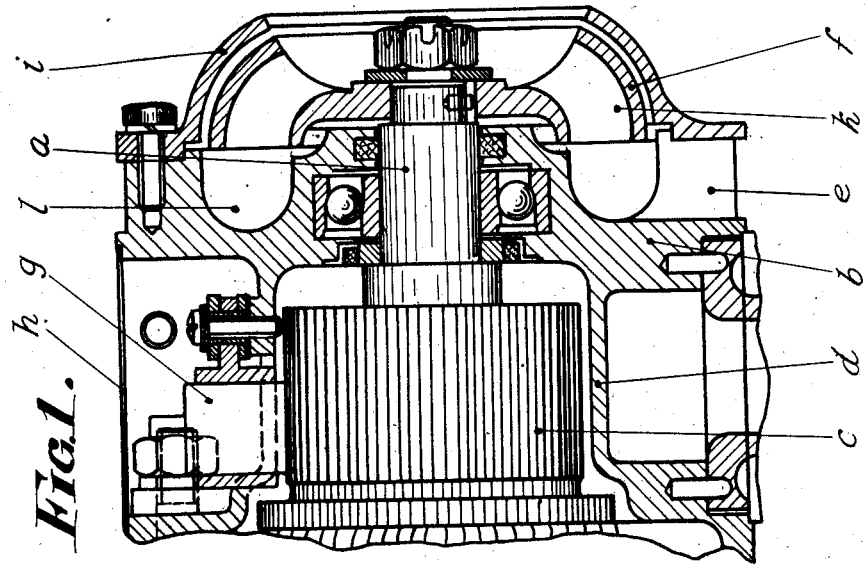
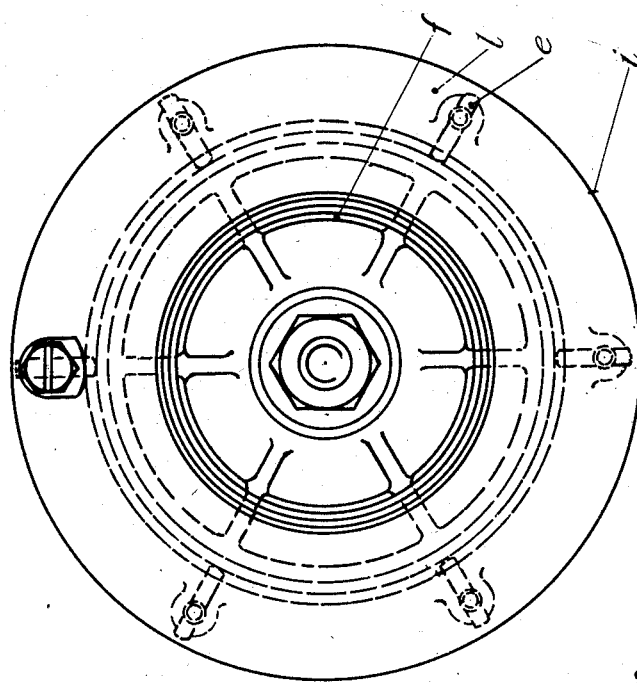
Inventor.
Gottlieb Steiner Patented Apr. 30, 1935

1,999,308

UNITED STATES PATENT OFFICE 1,999,308

COOLING OF MACHINES HAVING ROTARY PARTS

Gottlieb Steiner, Soleure, Switzerland

Application July 24, 1934, Serial No. 736,800
In Switzerland July 29, 1933

1 Claim. (Cl. 171—252)

This invention relates to cooling devices for dynamo-electric machines having rotary parts, more particularly such machines in which the rotary parts as the commutator are totally enclosed, either for the reason that these parts have to be shielded from external influences or that the surroundings must be shut off from any sparking which originates in the machine and may be the cause of fires or other disturbances, for instance, for radio apparatus.

According to the invention for this purpose the end bearing has an extension of substantially cylindrical shape, which is disposed closely around the commutator, the carbon brushes of the commutator being additionally completely shut off to the outside by a metal sheet, and on the external end surface of the commutator bearing radially extending ribs and openings are provided.

In the accompanying drawing a constructional example of the invention is illustrated, as applied to a dynamo-electric machine.

Fig. 1 is a longitudinal section of the machine.
Fig. 2 is an end view of the machine.

In the drawing $a$ is the rotary armature shaft with the commutator $c$. $b$ is the commutator bearing cover, the extended part $d$ of which is disposed with a small amount of clearance around the commutator $c$. The carbon brushes $g$ are shut off to the outside by a metal sheet $h$. With such an arrangement it is possible totally to enclose the commutator parts, at which sparking always occurs, so that all danger of fire is eliminated. The heat developed at the commutator is easily transmitted through the part $d$ of the commutator bearing to the bearing body proper and thence by way of the ribs $e$ under the action of the fan $f$ to the surroundings. The fan vane $f$ has radially extending ribs $k$ and is shut off from the outside by the cover $i$. The air is thrown to the outside by the ribs $e$, which also extend radially and through the openings $l$ of the bearing $b$.

What I claim is:

In a bearing cooling device for machines having rotary parts, in combination an end bearing cover, a rotary shaft, a commutator fixed to said rotary shaft, a cylindrically shaped extension of this end bearing cover disposed closely around said commutator, carbon brushes of said commutator, a metal sheet arranged around the latter and adapted to completely shut off said carbon brushes to the outside, cooling ribs and openings provided on the external end surface of the end bearing cover, an air vane mounted on said rotor shaft, radially disposed blades of said air vane, a cover fixed to the end bearing cover and adapted to protect the air vane to the outside.

GOTTLIEB STEINER.